United States Patent [19]

Benson

[11] 3,952,924
[45] Apr. 27, 1976

[54] DISPENSER FOR DISPENSING A LIQUID OR PASTY PRODUCT FROM A CONTAINER

[76] Inventor: Gustav Eric Valdemar Benson, Fridhemsvagen 20, 217 74 Malmo, Sweden

[22] Filed: May 31, 1974

[21] Appl. No.: 475,303

Related U.S. Application Data

[63] Continuation of Ser. No. 281,873, Aug. 18, 1972, abandoned, which is a continuation of Ser. No. 874,345, Nov. 5, 1969, abandoned.

[30] Foreign Application Priority Data

Nov. 8, 1968 Sweden .............................. 15138/68

[52] U.S. Cl. ................................ 222/181; 222/209
[51] Int. Cl.² .......................................... B67D 5/06
[58] Field of Search ........... 222/207, 181, 545, 209; 137/512, 512.4, 525.3

[56] References Cited
UNITED STATES PATENTS

| | | | |
|---|---|---|---|
| 2,954,048 | 9/1960 | Rychlik | 137/525.3 X |
| 3,220,611 | 11/1965 | Zander et al. | 222/207 X |

*Primary Examiner*—Stanley H. Tollberg
*Attorney, Agent, or Firm*—Robert E. Burns; Emmanuel J. Lobato; Bruce L. Adams

[57] ABSTRACT

Dispenser for liquid soap or the like having a pump chamber with flexible funnel-shaped inlet and outlet valves permitting passage of the liquid or paste through the chamber in one direction only, and a flexible bulb or like means for intermittently pressurizing the chamber to expel a quantity of the liquid or paste therefrom when required by a user.

7 Claims, 9 Drawing Figures

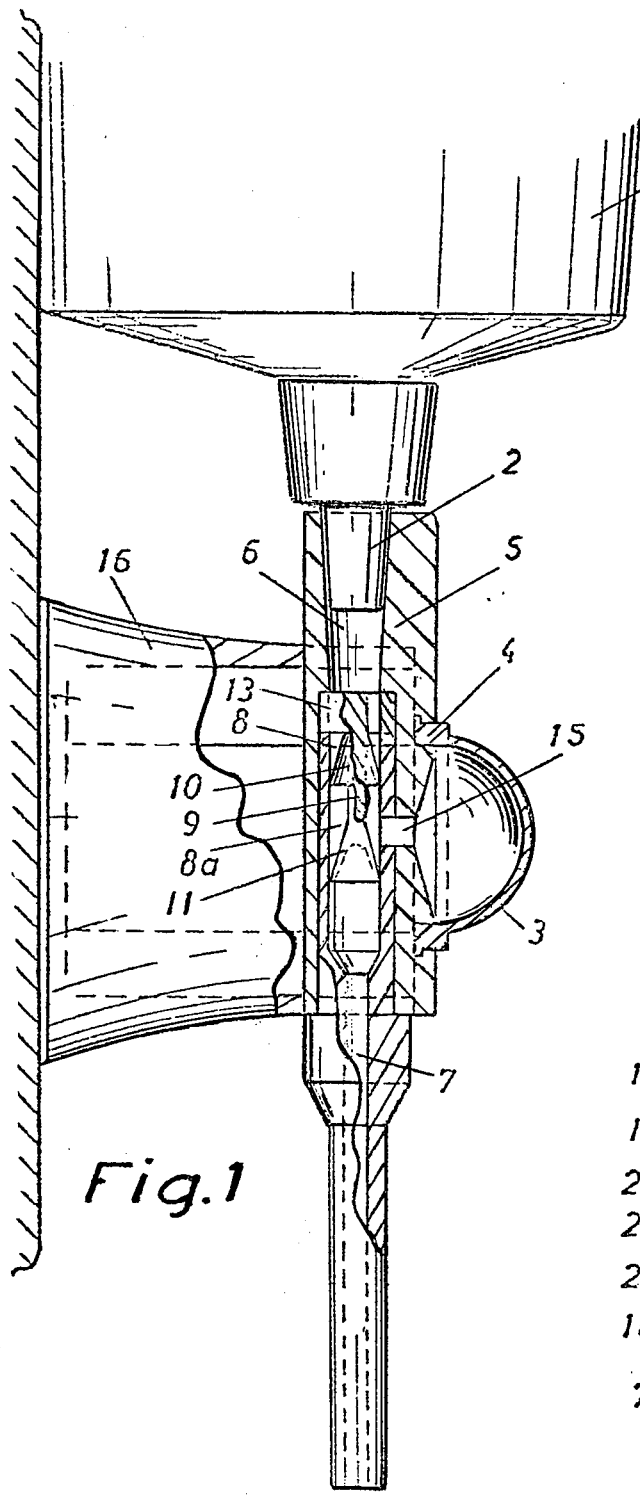
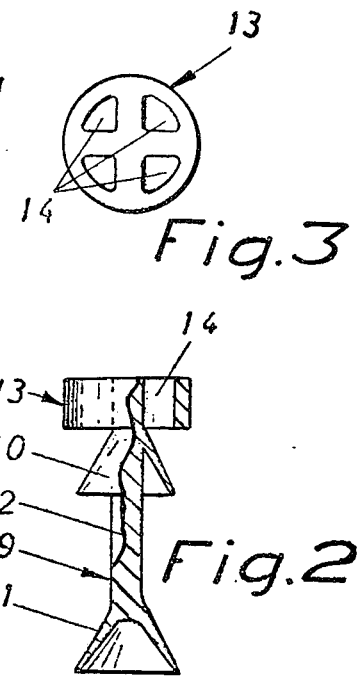
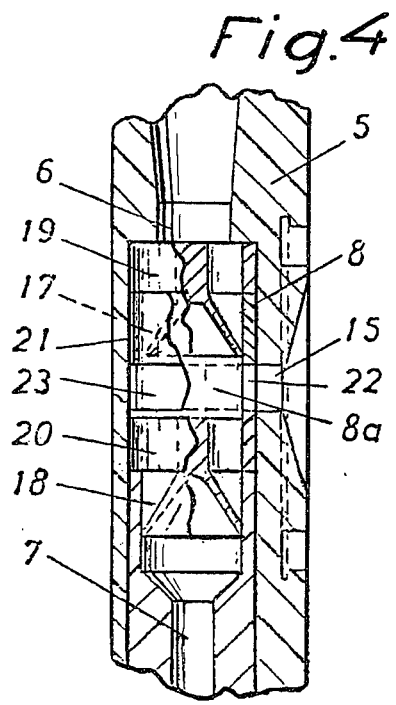

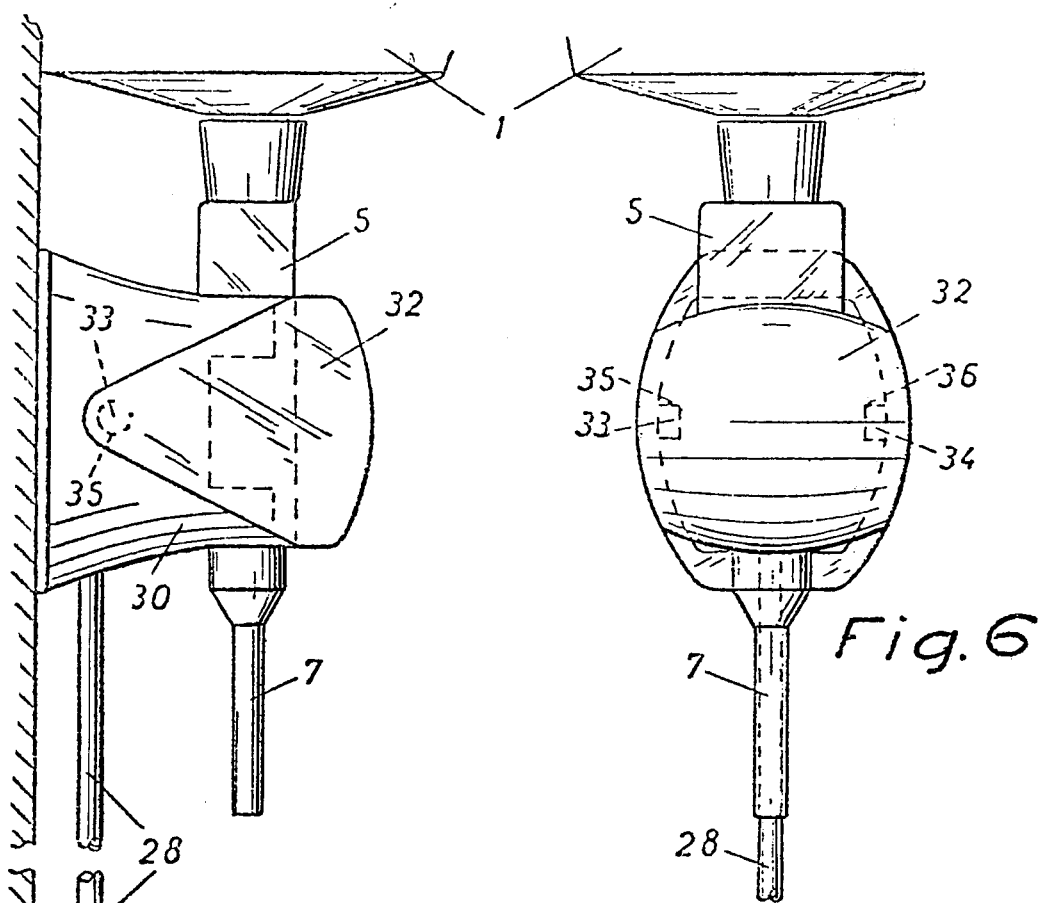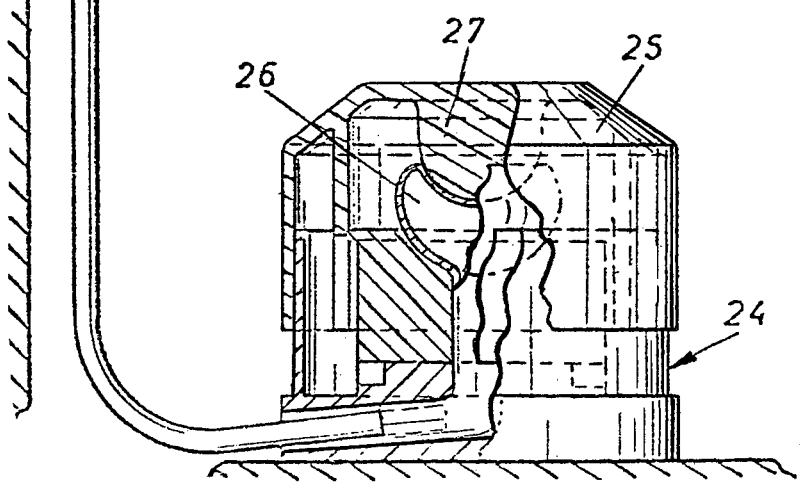

DISPENSER FOR DISPENSING A LIQUID OR PASTY PRODUCT FROM A CONTAINER

CROSS-REFERENCE TO PRIOR APPLICATIONS

This is a continuation of application Ser. No. 281,873 filed Aug. 18, 1972, which was a continuation of application Ser. No. 874,345 filed Nov. 5, 1969, both of said earlier applications now being abandoned.

BACKGROUND OF THE INVENTION

The present invention relates to a dispenser for dispensing portions of liquid or pasty products from a container.

Soap dispensers are for instance known for dispensing portions of liquid soap, and are mainly used in public wash-rooms, but they are especially unhygienic, since the contents are expelled by manual pressure on the mouthpiece of the apparatus. This construction is thus quite unsuitable for use in the washrooms of hospitals or the like.

Attempts have also been made to provide dispensers which are fitted with a double valve operable so that when a pressure was developed in a chamber housing the double valve closed with its upper half the through channel leading to the container on which the dispenser is fitted, its lower half opened this channel towards the exit pipe of the dispenser. These valve halves are however formed in a very disadvantageous manner as a mouthpiece, consisting for instance of flexible material, and conically tapering, the aperture consisting of a groove extending transversely across the cone surface. Since the lower half of the valve opens directly into the surrounding external air, an unavoidable oxidation of the liquid or pasty product takes place both at the mouthpiece and inside it. Consequently a plug forms in this half of the valve, and makes further operation of the dispenser impossible.

SUMMARY OF THE INVENTION

The present invention is intended to avoid the above-mentioned defects. The characteristic feature of the invention is that the valve comprises two funnel-shaped sealing flanges disposed a distance apart in the valve chamber with their smaller end towards the inlet end of the valve chamber, and that on development of excess pressure inside the valve chamber at a point disposed between the two flanges, the radially outermost part of the flange nearer the inlet end of the valve chamber is internally pressed against the wall of the valve chamber, and the radially outermost part of the second funnel-shaped flange is compressed, permitting the liquid or pasty product in the valve chamber to flow through the annular gap formed between the last-mentioned outermost part of the flange and the valve chamber wall.

The dispenser device provided by the invention is of very simple construction. It can also be completely made of rubber or plastic, so its manufacturing costs are low and all corrosion problems are excluded.

The dispenser device provided by the invention has only few movable parts and therefore operates very reliably. Both the container and the pump housing can be completely emptied, so that oxidation of the container contents is not possible. For the same reason the risk of dripping is also very slight. If the exit pipe has a small diameter, chosen in accordance with the viscosity of the contents, the risk of dripping is completely avoided due to the capillary effect. The device can be used to take portions of a large number of different liquids or creams. In washrooms or bathrooms for instance, several such units, either on separate wall brackets or affixed directly to the wall, can for instance contain liquid soap, hair oil, toothpaste, and skin- or other cosmetic creames. Such units can also be installed in a kitchen, either directly on the wall or on specially provided brackets, and contain for instance washing-up fluids, liquid soap or skin creams. The device can also contain mustard or tomato sauce and be used at the table.

The dispenser of the present invention can also be equipped with means for foot operation of the pressure bulb by means of a hydraulic system, or with a lever system for operating the pressure bulb, e.g. by using an elbow. This ensures extremely hygienic operation of the apparatus, which is of great advantage for use thereof in public washrooms, especially in hospitals or the like.

BRIEF DESCRIPTION OF THE DRAWINGS

FIG. 1 is a side view, partly in section, of a first embodiment of the invention;

FIG. 2 is a side view on a larger scale, partly in section, of a double valve;

FIG. 3 is a plan view of the double valve of FIG. 2;

FIG. 4 is a side view on a larger scale, partly in section, of a pump housing fitted with a double valve according to a second embodiment;

FIG. 5 shows the lay-out of one embodiment for foot operation, with the pedal shown partly in section;

FIG. 6 is a front view of the dispenser of FIG. 5;

DETAILED DESCRIPTION OF A PREFERRED EMBODIMENT

Figure 7:
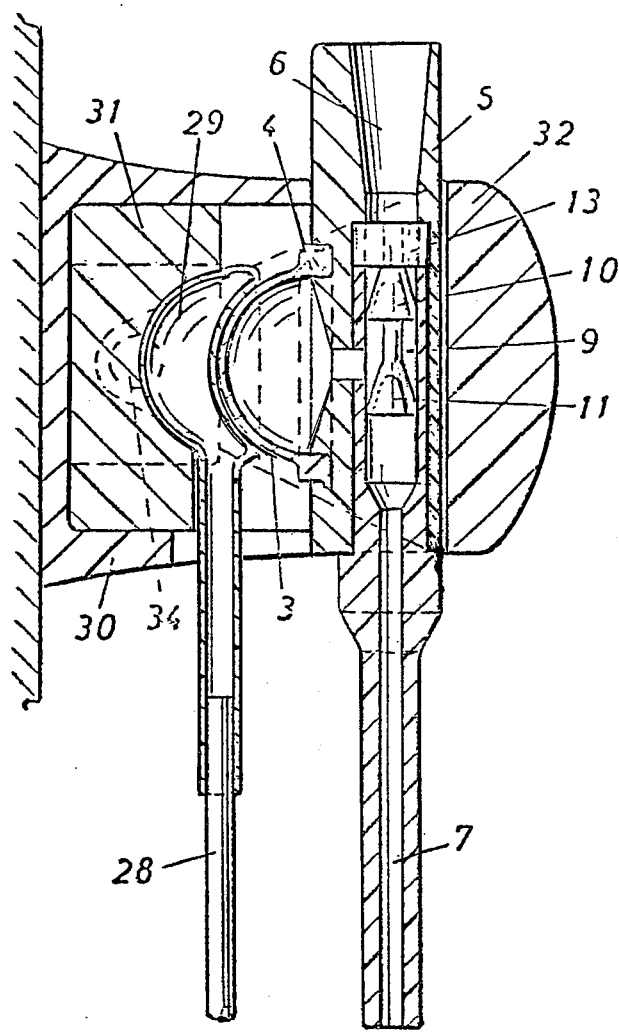
FIG. 7 is a vertical section through a foot-operated dispenser as in FIG. 5.

In FIG. 1, the mouthpiece 2 of a container 1 is inserted into a fitting in a container 1 in accordance with the present invention, which is shown as an embodiment with manual actuation of the pressure bulb 3. The pressure bulb is preferably affixed by induction welding to the outside of the pump housing 5, using a welding ring 4. The pump housing in turn has an internal channel 6 which tapers downwardly and merges into an outlet pipe 7. In a valve chamber 8 inside channel 6 there is inserted a valve 9, consisting partly of upper and lower funnel-shaped resilient flanges 10,11 which are connected together by a rod 12 and having their smaller ends towards the container 1, and partly of a valve 13 disposed at the upper end and provided with passages 14 (see FIGS. 2 and 3). The valve plate 13 is kept in a predetermined position by an extension of the outlet pipe 7, which forms the inner wall of channel 6, so that the valve 9 is controlled both axially and radially. A connecting channel 15 is also provided between the valve chamber and the pressure bulb 3.

The container 1 may for instance be a tube of soft plastic which is compressed by the pressure of the air after the contents are withdrawn.

In order to attach the device to a wall, for instance, the dispenser may include a bracket 16. The container 1 may also be of a permanent type, having a filling hole at its top end (not shown).

The valve 9 can also consist of two parts (FIG. 4) which may be advantageous from the manufacturing aspect. As in FIG. 2, the valve 9 comprises in this embodiment two resilient funnel-shaped flanges 17,18, each fitted with a valve plate 19,20 having passages. Between the two valve halves 19,20 is a spacer bush 21 having in its wall an aperture 22 and an annular channel 23; the connecting channel 15 and the aperture 22 in the spacer bush 21 need not necessarily lie opposite each other. In this embodiment the two valve plates 19,20 and hence the funnel-shaped flanges 17,18 lying against the inner wall of valve chamber 8 are kept in their predetermined position with the aid of spacer bush 21 and the extension of outlet pipe 7; in this case however the extension does not extend as far upwards as in the FIG. 1 embodiment for instance.

As shown for example in FIG. 5, the dispenser may be actuated by means of a pedal 24 which acts on the pressure bulb 3 (FIG. 7) through a hydraulic system. Depression of the upper movable part 25 of pedal 24 by the user's foot presses a member 27 projecting from the underside of the movable part 25 of pedal 24 into a liquid-filled bulb 26 disposed therein. This liquid-filled bulb 26 is connected via conduit 28 to a convex-concave operating bulb 29, also filled with liquid, mounted in the preferably dish-shaped base portion 31 of wall bracket 30. The pump housing 5 in this embodiment is identical with that in the embodiment described above, but together with the pressure bulb 3 is inwardly directed towards the wall bracket 30 so that on depression of pedal 24, the convex-concave operating bulb 29 swells out, assumes almost a spherical shape, and thus compresses the bulb 3.

Figure 8:
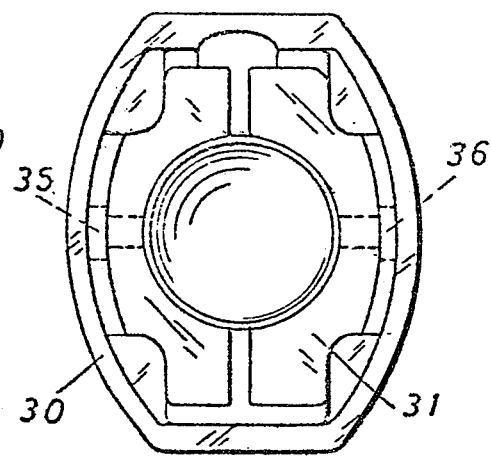
FIG. 8 is a front view of the wall bracket in FIG. 7.

As seen from FIGS. 5, 6 and 8, in the above-mentioned embodiment the pump housing 5 is affixed by a plate 32 to the wall bracket 30. The plate extends round the pump housing and is held thereon by projections 33,34 which clip resiliently into corresponding slots 35,36 formed in the wall bracket 30.

Figure 9:
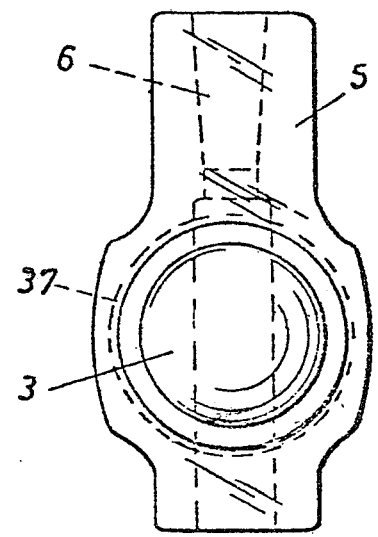
FIG. 9 is a front view of the pump housing in FIG. 7.

FIG. 9 shows the shape of the pump housing 5 with the channel 6 and a recess 37 to take the welding ring 4 and the pressure bulb 3.

The mode of operation of the various embodiments is based upon the same operating principle, and is described in detail below.

When the pressure bulb 3 is first pressed in (when the pump housing 5 is empty) by hand, or by the operating bulb 29 acted on from pedal 24 through a lever mechanism or the like, excess pressure is developed in the inner part 8a of valve chamber 8, i.e. the part of that chamber which is bounded by the two resilient funnel-shaped flanges 10,11 and 17,18 whereby the lower funnel-shaped flange 11,18 is somewhat compressed, and a quantity of air corresponding to the depression of pressure bulb 3 is forced out through the outlet pipe 7. At the same time the upper funnel-shaped flange 10,17 is sealingly pressed by the excess pressure against the inner wall of valve chamber 8. The pressure bulb 3 is then released, whereupon it springs outwards due to its elasticity and causes a reduced pressure in the inner part 8a of valve chamber 8, so that the lower funnel-shaped flange 11,18 is fully sealed and the upper funnel-shaped flange 10,17 is compressed and opened, so that some of the contents of container 1 are sucked into the inner part 8a of valve chamber 8 and some into the pressure bulb 3. When pressure bulb 3 is again pressed in, the material in the bulb and in the inner part 8a of valve chamber 8 is mostly expelled by the pressure in the valve chamber through the annular gap between the lower funnel-shaped flange 11,18 and the inner wall of the valve chamber, and then through outlet pipe 7. In this way it is possible to withdraw a predetermined quantity of the container contents at each compression of the pressure bulb 3.

The invention is not limited to any of the above-described embodiments and can be varied in many ways within the scope of the following claims. For example, the pressure bulb may be a bellows or the like extending around the pump housing.

What I claim is:

1. A dispenser for dispensing in dosage form a liquid or pasty product from a container comprising: a dispenser housing having means therein defining a product inlet for receiving therein the product to be dispensed, a product outlet for dispensing therefrom the product, and a passage providing fluid communication between said product inlet and said product outlet; means on said housing for connecting said product inlet to a container containing therein a product to be disposed during use of the dispenser; actuatable valve means for valving the flow of the product from said product inlet to said product outlet in dosage form, said valve means comprising means defining a valve chamber in said passage, and a pair of valve members fixedly disposed in said valve chamber in spaced-apart relationship from each other along the main direction of product flow, each valve member having a funnel-shaped configuration composed of a body portion and a resiliently flexible flared portion terminating in an annular lip which is resiliently flexible into and out of engagement with a peripheral portion of said valve chamber and each valve member having a normal at rest position wherein its annular lip contacts the valve chamber peripheral portion to block flow therepast of the product and actuatable to a closed position wherein its annular lip is flexed outwardly against said valve chamber peripheral portion to more effectively block flow therepast of the product and to an open position wherein its annular lip is flexed inwardly away from said valve chamber peripheral portion to permit flow therepast of the product; and actuating means for alternately actuating said pair of valve members to their open and closed positions in out of phase relationship with respect to each other so that one valve member is in the open position while the other valve member is in the closed position to effect dispensing of the product in dosage form from said product outlet.

2. A dispenser according to claim 1; wherein said actuating means comprises means for alternately positively pressurizing and negatively pressurizing the interior of said valve chamber between said pair of valve members.

3. A dispenser according to claim 2; wherein said last-mentioned means comprises a resiliently collapsible member manually collapsible to positively pressurize said valve chamber and resiliently expansible to negatively pressurize said valve chamber.

4. A dispenser according to claim 1; including means mounting said valve members in said valve chamber with their body portions extending towards said product inlet.

5. A dispenser according to claim 1; including a rod interconnecting said valve members independently.

6. A dispenser according to claim 1; wherein said actuating means comprises means for alternately positively pressurizing the interior of said valve chamber between said pair of valve members to simultaneously flex the flared portion of the downstream valve member outwardly to move its annular lip against said valve chamber peripheral portion while flexing the flared portion of the upstream valve member inwardly to move its annular lip away from said valve chamber peripheral portion and negatively pressurizing the interior of said valve chamber between said pair of valve members to simultaneously flex the flared portion of the downstream valve member inwardly to move its annular lip away from said valve chamber peripheral portion while flexing the flared portion of the upstream valve member outwardly to move its annular lip against said valve chamber peripheral portion.

7. A dispenser for dispensing in dosage form a liquid or pasty product from a container comprising: a dispenser housing having means therein defining a product inlet for receiving therein the product to be dispensed, a product outlet for dispensing therefrom the product, and a passage providing fluid communication between said product inlet and said product outlet; means on said housing for connecting said product inlet to a container containing therein a product to be dispensed during use of the dispenser; actuatable valve means for valving the flow of the product from said product inlet to said product outlet in dosage form, said valve means comprising means defining a valve chamber in said passage, and a valve unit which includes a pair of valve members and a rod coaxial and integral therewith and interconnecting them, said valve members being fixedly disposed in said valve chamber, being held by said rod in spaced-apart relationship from each other along the main direction of product flow, each valve member having a funnel-shaped configuration composed of a body portion and a resiliently flexible flared portion terminating in an annular lip which is resiliently flexible into and out of engagement with a peripheral portion of said valve chamber and each valve member having a normal at rest position wherein its annular lip contacts the valve chamber peripheral portion to block flow therepast of the product and actuatable to a closed position wherein its annular lip is flexed outwardly against said valve chamber peripheral portion to more effectively block flow therepast of the product and to an open position wherein its annular lip is flexed inwardly away from said valve chamber peripheral portion to permit flow therepast of the product; and actuating means for alternately actuating said pair of valve members to their open and closed positions in out of phase relationship with respect to each other so that one valve member is in the open position while the other valve member is in the closed position to effect dispensing of the product in dosage form from said product outlet.

\* \* \* \* \*